Figure 1:
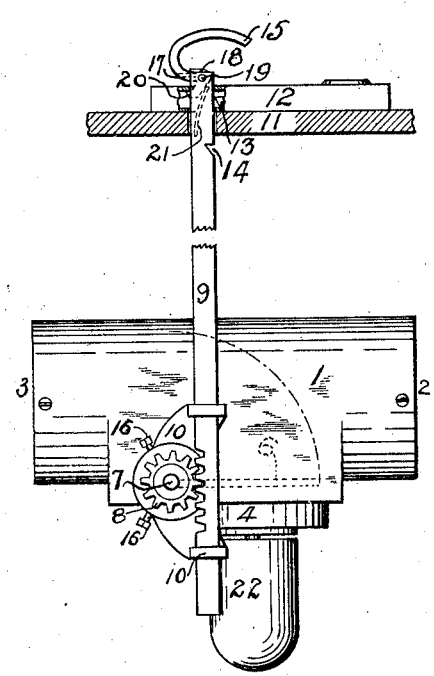

M. B. GLEESON.
MEANS FOR PREVENTING LARCENY OF MOTOR VEHICLES AND THE LIKE.
APPLICATION FILED APR. 4, 1917.

1,362,567.

Patented Dec. 14, 1920.

WITNESSES:
L. J. Martin.
George C. Milligan.

INVENTOR
Mortimer B. Gleeson.
BY
Thos. J. Martin Jr.
ATTORNEY.

UNITED STATES PATENT OFFICE.

MORTIMER B. GLEESON, OF PHILADELPHIA, PENNSYLVANIA.

MEANS FOR PREVENTING LARCENY OF MOTOR-VEHICLES AND THE LIKE.

1,362,567.  Specification of Letters Patent.  Patented Dec. 14, 1920.

Application filed April 4, 1917. Serial No. 159,739.

*To all whom it may concern:*

Be it known that I, MORTIMER B. GLEESON, a citizen of the United States, residing at Philadelphia, in the county of Philadelphia and State of Pennsylvania, have invented new and useful Means for Preventing Larceny of Motor-Vehicles and the like, of which the following is a specification.

My invention relates to contrivances for the prevention of theft or other unlawful or unwarranted use of motor vehicles and its objects are to afford automatic and effective means of attracting, in the mere act of starting the vehicle, instant and general attention, by causing thereby the emanation of violent, alarming, unusual, unlawful and offensive sounds and noises, and to provide for the continuation and increase thereof with the acceleration of the conveyance, as well as to provide a deterrent which will act as an effectual check upon persons disposed to unlawfully use motor cars and the like.

To accomplish my ends I may employ various actuating means of utilizing some of the energy of the motive power, such as the blast or pressure from the exhaust, whereby appropriate noise creating mechanism such as a whistle, or other instrument productive of loud and unusual sounds, certain to attract and compel immediate attention to their source may be forced into action and the emanations thus created continued with increasing volume and violence with acceleration of the vehicle. To such a combination, I add, in order to assure the proper and unfailing efficiency, locking means to "set" the device as well as adequate and substantial protective means to prevent its disablement by being meddled or tampered with.

Not the least valuable feature of the known use of my invention is the moral effect it must inevitably and eventually produce in deterring the automobile thief from attempting to appropriate a car. The mere knowledge of the possible inclusion of such an accessory would unquestionably prevent many an otherwise willing and eager wrong doer from taking possession of a vehicle, even where the opportunity might have every apparent promise of success. When well known and fully understood a wholesome fear of a mechanical, but unchokable, cry of "Stop thief," sure to summon witnesses and pursuers and result in speedy capture, will, perhaps, be more prolific in beneficial results than the actual operation of the device itself.

In the illustration herein employed as an example of my invention, I have utilized the exhaust from an internal combustion engine as my source of energy, and have described this form in the specification and shown its application in the accompanying drawings, in which—

Figure 2:
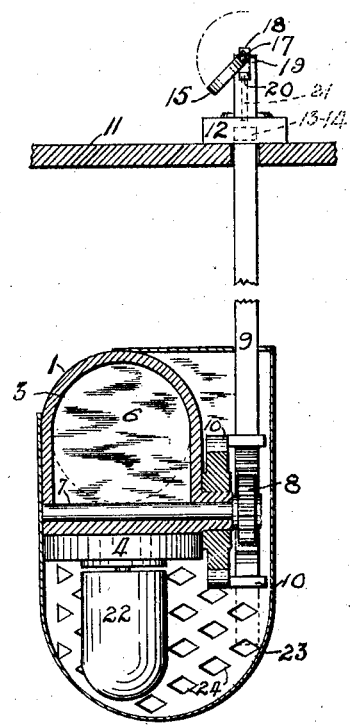
Figure 3:
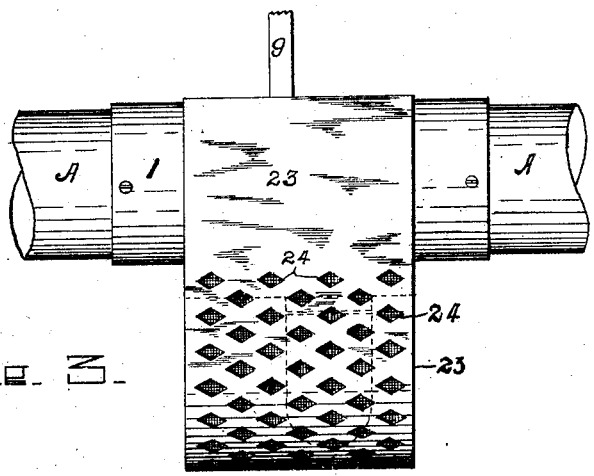

Figure 1 is a side elevation of the device with the protective casing removed and the car floor partly in section; Fig. 2, a rear elevation of the same with parts in section, showing position of the valve when the mechanism is "set;" and Fig. 3, a view of the apparatus inclosed.

Similar indices refer to similar parts throughout the several views.

The connective member used in attaching to a car this form of my device is a short section of conduit, 1, adapted to be inserted longitudinally in the exhaust pipe, A, of the conveyance, at any point convenient to the driver's station. This conduit is substantially a modified cylinder and is provided with an inlet, 2, and two outlets, 3 and 4. When my invention is applied to a completed car, a short length is cut from the exhaust pipe, A, between the engine and the muffler, (not shown), and the device inserted and suitably secured, in the space thus provided, to form a good joint. When, however, it is installed at the time of the assembling of the car, it would preferably be threaded onto the exhaust pipe at the point mentioned. This location ahead of the muffler secures the desired unchecked force of the exhaust blast to suitably accomplish my design and further permits the operating rod 9 to penetrate the car floor adjacent to the driver's position and at a suitable angle to facilitate its operation. A valve, 6, is so positioned within the conduit 1 that a partial turn of its stem 7, rotatably mounted in the conduit, will direct the flow of the gases entering through inlet 2, to either outlet, 3 or 4, as desired. When the device is not in use the valve 6 lies horizontally across the outlet 4, as shown in broken lines, Fig. 1, leaving the exhaust pipe, A, free and clear; but, when it is desired to set the alarm, the stem 7, is rotated to turn the valve to the vertical position, shown in Fig. 2, thus closing the exhaust pipe at 3 and opening wide the outlet 4.

To impart such rotation to the valve stem 7, a pinion 8, is thereon secured and engaged with a reciprocable rack bar 9. This in turn, is slidably retained and guided by member 10, which is adjustably secured to the conduit 1, in such manner that the whole may be rotatably adjusted while the rack and pinion are engaged. It is seen arranged concentric with the stem and pinion and secured, when adjusted to the conduit, by screws 16. By this construction the bar 9, may be placed at any convenient angle to reach the desired location in the floor, 11, of the car, through which it extends to be available for use.

Suitably secured to or embedded in the floor is a reliable lock, 12, preferably a spring lock of the Yale type, the case or housing of which the bar, 9, also penetrates in such way as to reciprocate when operated, adjacent to the lock bolt 13. In the bar is formed a suitable recess, 14, adapted to be automatically engaged by the bolt when brought up directly in line therewith, and to facilitate reciprocation of the bar longitudinally a handle, 15, is attached at the upper end, just above the car-floor 11. This handle is swiveled at 17 to the lever 18 pivoted to the bar at 19 and so shaped that its lower extremity, which terminates in a spring latch or bolt 20, normally, under pressure of a spring, 21, projects beyond the side of the bar and serves to engage the casing of lock 12, as seen in Fig. 1, when the bar is depressed, and to thus firmly secure the parts against displacement or vibration by any jolting of the car. When not being grasped the handle gravitates to the floor or lock and is not in the way.

To the outlet 3, is attached the noise producing mechanism. I have selected to aptly illustrate my invention, a whistle 22, adapted to produce a very loud, shrieking and disagreeable noise, similar to that sometimes heard on railroad locomotives, and which may be relied upon to attract instant attention. Of course, any other vapor controlled noise maker of sufficient power and volume and of alarming nature, may be substituted in the combination.

A protective closure, 23, so envelops the construction as to preclude access to the vital parts and prevent disablement. It is amply provided with orifices, 24, to permit of the proper escape of the sounds.

The operation of the mechanism is simple and obvious. When leaving the car, the driver simply pulls on the handle 15 thereby first operating lever 18 which withdraws latch 20 from securing engagement with the case of the lock 12 and releases the bar 9, which is then immediately drawn up. This act, by reason of the engagement of bar 9 with pinion 8, results in the rotation of valve 6, one-quarter turn whereby the valve throws open the outlet 4 into the whistle and simultaneously closes the outlet 3 of the exhaust, whereupon motion of all the parts is checked. At this stage, the spring-bolt 13 automatically enters and engages the recess 14 and all parts of the mechanism are instantly locked in position to operate. The appliance is then "set" and any action of the engine must necessarily result in the blasting of the whistle; and, the more rapid the attempted get-a-way, the louder and shriller the blast, which, of course, is continuous. When the driver is about to resume his riding, he simply applies the key, in the usual way, to the lock 12, and withdraws the bolt 13 from the recess 14, whereupon, should the parts fail to gravitate to the first position, a slight tap or push on the bar 9 is sufficient to cause their return, the lower sides of both of the bolts, 13 and 20, being beveled to facilitate such self-action.

For the purpose of clearly illustrating my invention, I have described and shown in the accompanying drawings the method at present preferred by me, although it is to be understood that the various instrumentalities and combinations of which my invention consists can be variously arranged and organized and that my invention is, therefore, not to be limited to the precise arrangement and organization herein shown and described, and that I hereby reserve the right to reorganize and rearrange these instrumentalities and combinations within the scope of my claims.

I am aware that, prior to my invention, horns and the like have been operated through the exhaust, though only for cautionary purposes, and I do not claim such a combination broadly, but I do claim:

1. In combination with a motor vehicle, protective means of the character described comprising a 3-way casing or T-pipe interposed in the exhaust pipe of the engine and between the engine and the muffler, a whistle operably connected with the intermediate orifice of said casing, an idle butterfly valve so disposed within said casing as to close the channel to the muffler and open the outlet to the whistle when in one position and to close this outlet and open said channel when in the other position, rack and pinion mechanism to operate said valve so adjustably connected therewith as to afford operation at various angles thereto, a reciprocable member to shift said rack, a self-acting lock to retain said member at one limit of reciprocation and a self acting latch to retain said member at the other limit of reciprocation.

2. In combination with a motor vehicle, protective means of the character described comprising a 3-way casing or T-pipe interposed in the exhaust pipe of said engine and between the engine and the muffler, a whistle operably connected with the intermediate orifice of said casing, an idle butterfly-valve within said casing adapted to close the channel to the muffler and open the outlet to the whistle when in one position and to close this outlet and open said channel when in the other position, rack and pinion mechanism to operate said valve so adjustably connected therewith as to afford operation at various angles thereto, a reciprocable member to shift said rack, a self-acting lock to retain said member at one limit of reciprocation, a self-acting latch to retain said member at the other limit of reciprocation, a movable handle on said member, and releasing means for said latch coöperable with said handle.

MORTIMER B. GLEESON.

Witnesses at signing:
JOSEPH M. HUGHES,
ROBERT S. McDUELL.